Figure 1:
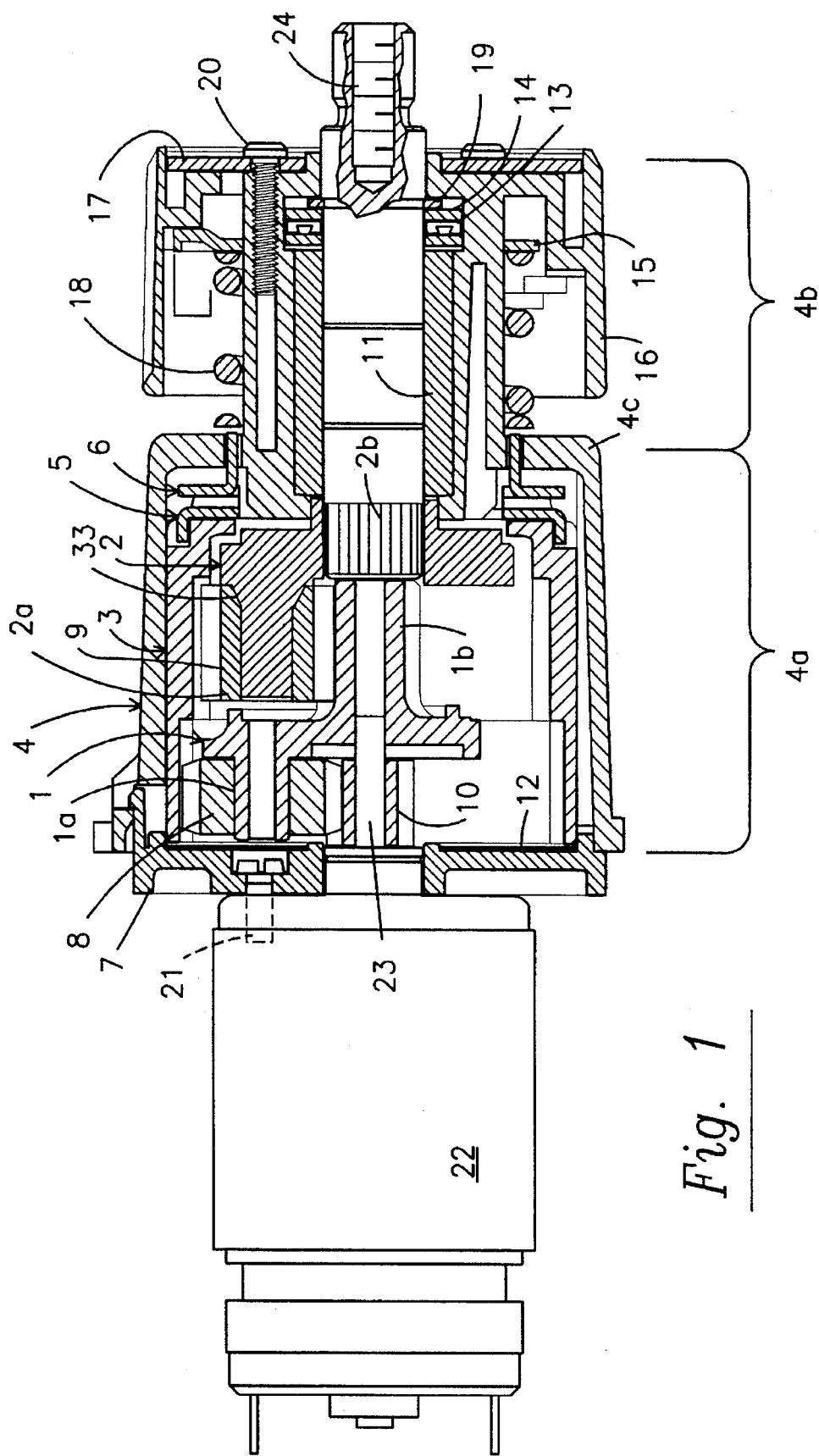

United States Patent [19]

Enzmann et al.

[11] Patent Number: 5,551,927
[45] Date of Patent: Sep. 3, 1996

[54] GEAR MECHANISM FOR ACCUMULATOR DRIVEN ELECTRIC DRILL OR ELECTRIC SCREWDRIVER

[75] Inventors: Bernd Enzmann, Villingen-Schwenningen; Hansjörg Maus, Donaueschingen, both of Germany

[73] Assignee: IMS Morat Sohne GmbH, Germany

[21] Appl. No.: 280,237

[22] Filed: Jul. 25, 1994

[30] Foreign Application Priority Data

Jul. 23, 1993 [DE] Germany ............... 43 24 876.4

[51] Int. Cl.⁶ ............... F16H 35/10; B25B 21/00
[52] U.S. Cl. ............... 475/265; 464/39
[58] Field of Search ............... 475/265; 464/39

[56] References Cited

U.S. PATENT DOCUMENTS

| | | | |
|---|---|---|---|
| 2,176,928 | 10/1939 | Short | 464/39 |
| 2,609,118 | 8/1952 | Disser | 464/39 |
| 3,079,814 | 3/1963 | Nickstadt | 475/265 |
| 3,587,346 | 6/1971 | Takahashi . | |
| 3,752,278 | 8/1973 | States | 464/39 |
| 4,597,453 | 7/1986 | Kilmer et al. . | |
| 4,614,134 | 9/1986 | Bohle | 475/265 |
| 4,635,489 | 1/1987 | Imamura et al. | 475/265 |
| 4,641,551 | 2/1987 | Pascaloff . | |

FOREIGN PATENT DOCUMENTS

| | | |
|---|---|---|
| 0074241 | 3/1983 | European Pat. Off. . |
| 0525911 | 2/1993 | European Pat. Off. . |
| 2726818 | 12/1977 | Germany . |
| 3148338 | 2/1982 | Germany . |
| 3742952 | 7/1989 | Germany . |
| 4123349 | 3/1993 | Germany . |

Primary Examiner—Dirk Wright
Attorney, Agent, or Firm—Dominik & Stein

[57] ABSTRACT

The preferably for use in an accumulator driven electric drill or electric screwdriver provided gear comprises an overload coupling for limiting torque for the adaptation to various torque loads. The overload coupling is comprised essentially of an annular gear which is formed of a plastic material and which circumscribes and is associated with a planetary gearing, which has an internal teeth which are in engagement with the planetary gear. A spring element presses against the annular gear, in order to press the annular gear axially against a detente wall, so that the annular gear is frictionally prevented from rotation, until a predetermined torque loading is exceeded and upon exceeding of the predetermined torque loading the annular gear is allowed to rotate. For this there is provided between the plastic annular gear and the spring element a metallic cam disk, which is non-rotatingly secured to the annular gear.

15 Claims, 3 Drawing Sheets

GEAR MECHANISM FOR ACCUMULATOR DRIVEN ELECTRIC DRILL OR ELECTRIC SCREWDRIVER

The invention is concerned with a gear mechanism having the characteristics of the preamble of claim 1, as well as the use thereof.

A gear mechanism of this type is used nowadays in an accumulator driven electric screwdriver, a so-called accudriver. In this accumulator driven electric screwdriver the rotations imparted by a motor to a first shaft are geared down via a planetary gear to a drive shaft having a screw chuck. For adaptation of the accu-screwdriver to various task loads, a torque limiter device is provided in the form of an overload clutch. With this torque limiter, screws can be driven to a specified torque. The overload clutch comprises an annular gear which circumscribes the final planetary gear step, and which has internal teeth which are in engagement with the planetary gear of the final step. In addition a pressure spring is provided, which via a pressure ring urges the annular gear axially against a detente wall where it is held against rotation by frictional contact so long as a predetermined torque force is not reached. Upon exceeding the predetermined torque load the pressure of the spring against the annular gear is no longer sufficient, so that the annular gear begins to slip and becomes free to rotate.

In order to increase the frictional engagement effect, the face of the annular gear facing the contact pressure spring is provided with a basin-like recess in which, in the case that the above mentioned torque force is not yet reached, balls of a ball bearing ring are seated under pressure of the pressure spring. If against this the above mentioned torque force is exceeded, then these bails slip out of the basin-like recesses so that the annular gear begins to rotate, and thereby establishes a torque limitation.

For reasons of the high axial force- and rubbing-load on the annular gear occurring thereby, this part in the conventional gears is made of a metal, preferably a sintered metal, since this exhibits a great hardness.

The production of these sintered metal parts is complicated and thus expensive. First the metal powder must be introduced into a form and the powdery material must be compacted under the influence of pressure or temperature at a temperature, which is not less than the melting point of the material. During this process the material begins to melt and to bake together at the grain interfaces of the metal powder. As a rule the preform is presintered in a first step and then fully sintered for maximal densification in a second step.

Beyond this, the conventional gear is characterized as being relatively loud and thereby emits unpleasant operating noises.

Gears of electrically driven tools, such as for example electric screwdrivers, are further known from DE 41 23 349 C1, DE 37 412 952 A1 as well as DE 27 26 818 B2.

DE 41 23 349 C1 discloses a screwdriver with a gear mechanism, which is comprised of a planetary gear with an annular gear and a thereto connected overload coupling. The overload coupling is comprised of a pressure spring, which acts axially against the face side of the second annular gear of a planetary gear mechanism. For this, there is provided between the pressure spring and the front face of the second annular gear a so-called roller receiver for receiving of radially to each other positioned rollers as well as between these rollers positioned balls, which are pressed by the spring via an axial disk into intermediate recesses in the rollers. Upon reaching of a predetermined torque force limit the balls move out of their position between the rollers, so that a counter torque force is exercised on the annular gear of the gear mechanism and thereby a workable overload protection is realized.

In DE 37 42 952 A1 there is described a motor driven machine with variable torque settings with a motor and a planetary gear which drives a main spindle. The planetary gear circumscribes a rotatably mounted annular gear which upon exceeding of a preselected adjustable torque works against the force of a spring to activate a motor cut off switch. The spring force is made available by a torsion rod.

The overload arrangement for a gear for an electrically driven tool in DE 27 26 818 B2 is, similar to the gear mechanism in DE 41 23 349 C1, coupling balls.

The invention is concerned with the further development of the gear mechanisms as discussed above, so that the above mentioned disadvantages are avoided and additionally a simple assembly procedure of the gear mechanism is made possible.

The object of the invention is solved in accordance with the inventive characteristics set forth in claim 1.

Further developments of the invention are set forth in the dependent claims.

A process for using the gear mechanism according to the invention is the subject matter of claim 12.

The invention consists essentially thereof, that the annular gear provided in the overload coupling is constructed of a plastic and that between the annular gear and the spring device there is provided a guard plate, preferably a metallic cam plate. The material of the guard plate must, in accordance with the invention, have a greater dimensional stability than hardness than the annular gear. The guard plate or, as the case may be, cam plate, is in accordance with the invention, mounted non-rotatingly on the annular gear, so that the pressure force of the spring can act axially on the face side of the annular gear through the guard plate or, as the case may be, cam plate, and that nevertheless the frictional forces occurring at the time of the torque limiting act directly on the guard plate or, as the case may be, cam plate. In this way the relatively soft face side of the plastic annular gear is effectively protected against the driving or damaging forces resulting from the slipping of the torque overload coupling.

A further advantage of the construction of the gear mechanism according to the invention is in the quietness of the running noise. The reason for this lies in that, in accordance with the invention, the plastic gear wheels of the planetary gears mesh with the plastic inner gearing of the annular gear, and upon overload the plastic annular gear rubs against the inner wall of the likewise of plastic constructed gear housing, whereby like materials come into moving contact with each other. In the conventional gear mechanisms as discussed in the background section, on the other hand, the annular gear which is constructed of metal contacts the metal toothed gears of the planetary gear, so that a comparatively higher running noise is generated as compared to the gear mechanism according to the invention.

In a further development of the invention, the guard plate or as the case may be cam plate is provided removably seated on the annular gear in a non-rotating manner with respect the annular gear. The primary advantage of such a further development is that upon wearing out of the guard plate or, as the case may be, cam plate, it is not necessary to replace the entire annular gear, but rather only the guard plate or, as the case may be, cam plate.

For removable connecting of the guard plate or, as the case may be, cam plate, and annular gear the annular gear is provided on it's face side with recesses and the guard plate or, as the case may be, cam plate, is provided with protrusions which are received in the recesses of the annular gear and there secure the guard plate or, as the case may be, cam plate, in a non-slip relation to the running direction of the annular gear. In this way it is ensured, that in the non-moving annular gear, that is, during a torque transmission from the drive shaft to the output shaft at less than the above-discussed torque overloading, also the guard plate or, as the case may be, cam plate, is at rest. If there begins to occur a slipping or as the case may be rotating of the annular gear upon exceeding of the torque limit, the guard plate or, as the case may be, cam plate, is taken along with the annular gear.

The metallic cam plate is preferably comprised of a very ductile and malleable metal, so that the metallic cam plate can be easily produced by means of a stamping process. The cam plate can thus be formed as a simple stamped part, and the production can be substantially simplified.

The annular gear according to the invention is comprised in a preferred embodiment of an injection moldable thermoplastic, which has a sufficient mechanical stability. As injection moldable thermoplastic materials there can be mentioned, for example, a polyamide 6.6 with mineral fillers.

A particularly easy to assemble embodiment of the gear mechanism is comprised of a spring installation in the form of a pressure spring 18, which by means of a fixed pressure ring imparts axial pressure to the metallic cam disk and thereby to the annular gear. The cam disk and the pressure ring are positioned with flat surfaces facing each other. For increasing of the frictional forces the surfaces of the pressure disk and cam disk facing each other are provided with wedge- or engaging-elements, preferably as projections arranged in a ring on the pressure ring or on the cam disk. The pressure ring is comprised in a preferred embodiment like the metal cam disk of a very ductile and malleable metal, so that it also can be produced in a simple way by means of a stamping process using a metal plate.

In a further preferred embodiment of the invention the annular ring is provided with at least one planetary gear which is carried on a planetary gear carrier, which meshes with a drive shaft, whereby the planetary gear carrier is provided with a bulge-like reinforcement in an area lying opposite the distal end of a drill spindle of the planetary gear carrier. As a result of this kind of strengthening of the planetary gear carrier the above-discussed torque loading can be increased, without it resulting in a breaking of the planetary gear carrier or as the case may be drill spindle of the planetary gear carrier during operation. Thus a greater torque transfer from the drive shaft to the output shaft can occur, without there being need to resort to the overload coupling.

The planetary gear is in a further embodiment constructed in two stages with respectively different reductions or step-down gearing and the annular gear is provided with an internal gearing which is adapted to meshing with both stages. This makes possible a variable reduction of the gear at differing torque loads.

For the construction of a lubrication reservoir between the annular gear and the gear housing the gear housing is provided with a cylinder shaped inner wall for receiving of the annular gear, and the inner wall is partially conically shaped. The parallel to each other running sections of the inner wall serve during assembly of the gear mechanism according to the invention for a good guiding and a good subsequent seating of the annular gear within the gear housing, while the conical sections of the inner wall and the annular gear result in the formation of a cleft in which reception of lubricant is possible. Beyond that, the gear housing which is conventionally formed of plastic is easier to extract from the mold due to it's conical section.

The inventive gear is particularly suitable for use in an accumulator driven electric drill or as the case may be electric screw driver tool. As a result of the fact that most of the parts employed in the gear mechanism are made of plastic, such an accumulator driven electric drill or as the case may be electric screw driver tool is characterized by a relatively light weight. In comparison to the conventional accumulator driven electric drill or as the case may be electric screw driver tools, this weight is further reduced by the employment of an annular gear which is made of a plastic.

The further embodiments of the invention with respect to the partially conical design of the inner wall of the gear housing, the bulge-like reinforcement of the planetary gear carrier as well as the stepped reduction inner gearing of the annular gear can also be employed in gear mechanisms independently from each other. A combination together with the above described overload coupling with plastic annular gear is not necessary, however, as a whole, it is of advantage to the gear mechanism according to the invention.

Figure 2:
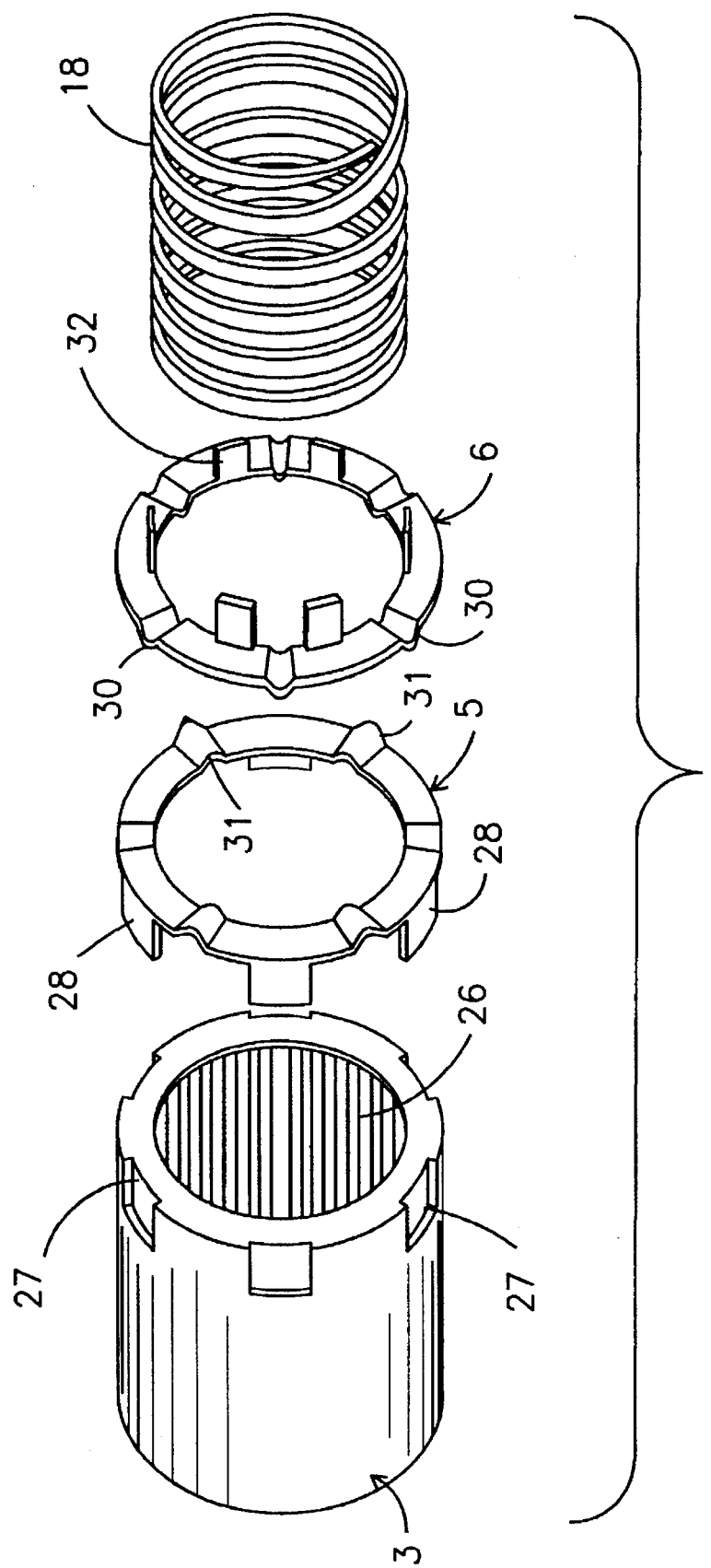
Figure 3:
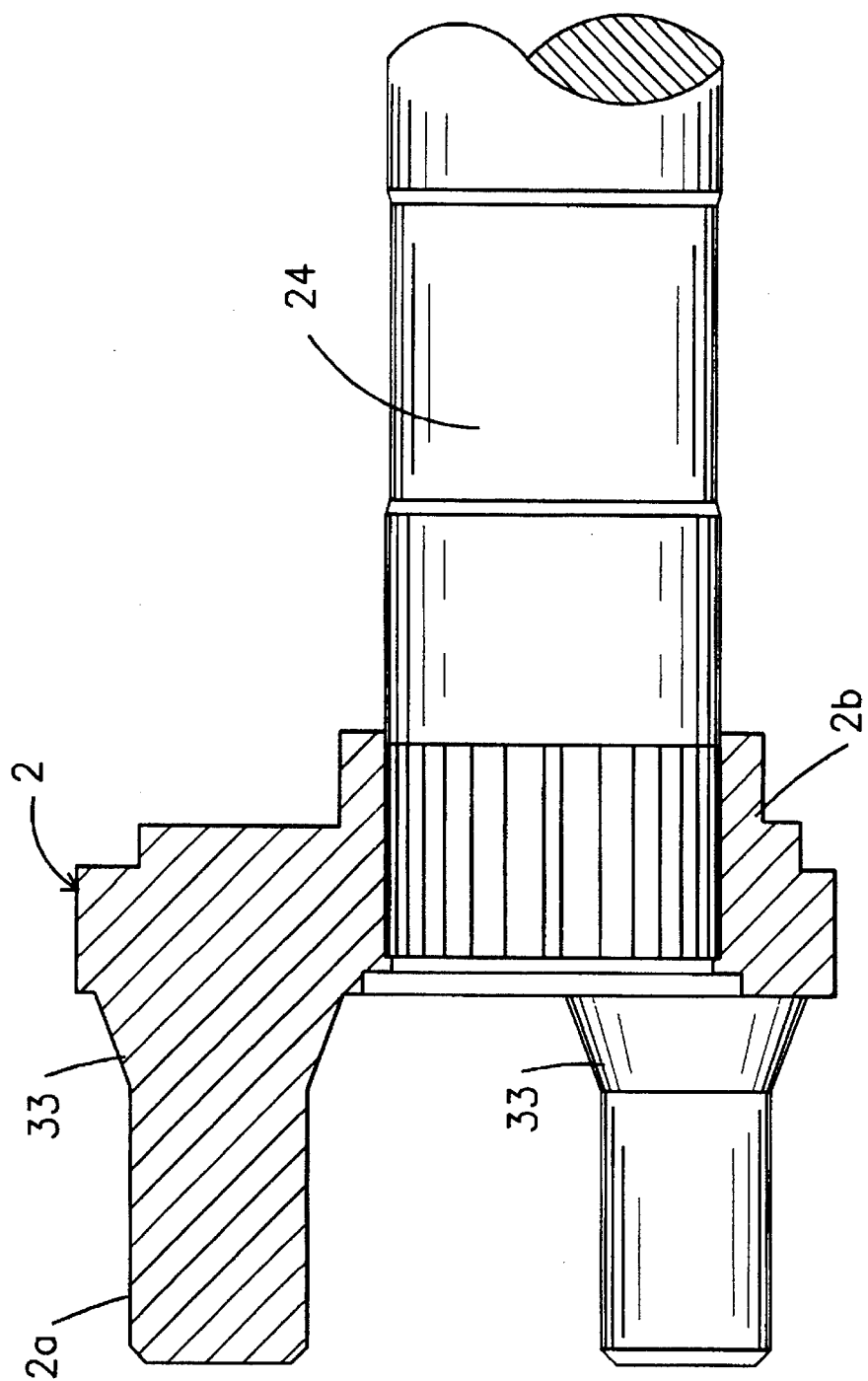

In the following the invention will be further described in greater detail in association with the figures. There is shown:

FIG. 1 a drive section for an accu-driver with a gear mechanism according to the invention FIG. 2 an exploded view of the components annular gear, cam disk, pressure ring as well as pressure spring of a torque limiter device according to FIG. 1, and FIG. 3 a planetary gear carrier with bulge like reinforcement provided within the gear mechanism of FIG. 1.

In FIG. 1 a drive unit for an accu-driver is shown. The drive unit is comprised of an electrical motor 22 with a drive shaft 23 which projects into a drive housing 4. On one of the sides facing the drive shaft 23 of the electromotor 22 a motor flange 7 is fastened by means of cylinder screws 21. On this motor flange 7 there are preferably provided snap connections for retaining of the gear housing 4. Internal of the gear housing 4 an annular ring is provided, in order to effect a reduction in revolutions from the drive shaft 23 of the electro motor 22 to the output shaft 24. The drive shaft 23 and output shaft 24 are provided on a common axis A. On the output shaft 24 there is attached, in the case of an accu-screwdriver, a suitable and in FIG. 1 for reasons of better overview not shown screw chuck.

The gear housing 4 is, in the embodiment shown in FIG. 1, formed in the shape of a cylinder, whereby the gear housing in the front, the drive shaft 23 associated area 4a, has a greater diameter, than the rear area 4b, which is associated with the output shaft 24.

In the front area 4a there is provided within the gear housing 4 the already discussed planetary gear in the form of a two step planetary gear mechanism. This two step planetary gear consists of a first planet carrier 1 with three drill spindles 1a facing in the direction of the electromotor 22 as well as a planet gear carrier stem 1b, wherein the axis of the planet carrier stem is collinear with the axis of the drive- or as the case may be output-shaft A. On the drill spindle 1a of the first planet gear carrier 1 there are respectively rotatably mounted as planet wheels 8 toothed gear wheels, preferably constructed of plastic, which are in engagement with the motor pinion 10 provided on the drive shaft 23 of the electromotor 22. Although the first planet carrier 1 may in principal be provided with only a single drill spindle 1a, it is preferred in order to achieve a more even running to have multiple, preferably three, drill spindles 1a provided at intervals of 120° with respect to each other.

The planetary gear mechanism is comprised beyond this of a second planetary gear carrier 2 with preferably three drill spindles 2a. The planetary gear stem 2b of the second planetary gear carrier 2 is fixedly connected with respect to the output shaft 24. On the drill spindle 2a of the second planetary gear carrier 2 two planetary gears 9 are rotatably mounted, which are in engagement with the teeth provided on the planet carrier stem 1b of the first planet carrier 1.

In an embodiment of this type of the planetary gear as a two stage planetary gearing there is achieved a variable reduction with varying torque overload conditions. The translation of the two stages of the in FIG. 1 shown planetary gearing can, for this, for example, be so selected that the fundamental conversion of the first stage is 6:1 and the fundamental conversion of the second stage is 4.8:1.

For adaptation of the accu-screwdriver to various loads it is provided with a torque limitation device in the form of an overload coupling. This is comprised, in the embodiment shown in FIG. 1, of a cylinder like annular gear 3, a metallic cam disk 5, a metallic pressure element 6 as well as a pressure spring 18 constructed as a spiral spring. The annular gear 3 which is comprised of plastic, for example of polyamide 6.6 with mineral fillers, is seated inside the gear housing 4 and is provided with an stepped internal gearing, so that the planetary gears 8 of the first stage and the planetary gears 9 of the second stage of the planetary gearing are in engagement with the corresponding respective inner teething of the annular gear 3. The annular gear 3 is, through axial pressure of the pressure spring 18 transmitted through the pressure element 6 and the cam disk 5, pressed against a detente wall 12, here a detente disk of metal, which is provided within the gear housing 4 on the motor flange 7. This pressing force is adjustable by means of an adjustment ring 16 which can be adjusted by the operator of the accu-screw driver. For this the pretensioning of the pressure spring 18 is adjustable by means of an curve built into the setting ring 16. Therewith the annular gear 3 is pressed against the detente wall 12 with a pressure from the pressure spring 18 via the pressure piece 6 and the cam disk 5. The annular gear 3 thereby remains fixed up to the point that the torque load of the accu-driver exceeds the frictional force. Once the torque loading exceeds this value, the annular gear slips out and begins to rotate. In this way the torque limit of the gear according to the invention is established and thereby the screw is tightened up to the predetermined torque.

The arrangement of the annular gear 3, the cam disk 5, pressure piece 6 as well as the pressure spring 18 is explained in greater detail in association with FIG. 2.

In order to provide a more complete description it can be mentioned, that in the embodiment as shown in FIG. 1 the drive shaft 24 in the back area 46 of the gear housing 4 is surrounded by a spindle bearing 11, on the face side of which in the direction of the drive shaft 24 a ball cage 13 as well as an axial disk 14 is connected to a shaft securing ring 19. The above mentioned setting ring 16 is on its face side covered with a cover plate 17 and secured by means of screws 20 on the gear housing 4. Further, a spring spanning ring 15 is provided between the pressure spring 18 and the setting ring 16.

In FIG. 2 the annular gear 3, the metal cam disk 5, the pressure ring 6, as well as the pressure spring 18 is shown in exploded view. The annular gear 3 provided with internal gearing 26 is on the side of the metallic cam disk B provided with recesses 27, in which protrusions 28 of the cam disk 5 engage, so that the cam disk 5 is connected to the annular gear 3 in a fixed relationship when assembled. The cam disk 5 and the pressure ring 6 are preferably formed as stamped pieces and exhibit on their respective facing surfaces wedging or engaging elements 30, 31. These engaging elements 30, 31 are shown in FIG. 2 as protruding projections 31 or 30 arranged ring-like on the cam ring 5 or as the case may be pressure ring 6. Upon the flat interfacing of the cam ring 5 or as the case may be pressure ring 6 these projections result in that a higher frictional resistance must be overcome before the annular gear 3 is caused by the torque load to be released and begins to revolve. The pressure ring 6 is provided with projections 32 projecting on side facing the pressure spring 18 axially in the direction of the pressure spring 18, upon which projections the pressure spring 18 exerts it's force. These projections 32 extend through openings in a radial wall section 4c (compare FIG. 1) of the gear housing 4, so that the pressure spring 18 which is provided outside of the gear housing 4 can exercise an axial pressure on the annular gear 3 provided inside the gear housing 4.

It is to be noted, that the arrangement according to the invention comprising a cam disk 5 and pressure disk 6 is not limited to the embodiment as represented in FIG. 2. A wide variety of other designs of cam disks 5 and pressure disks 6 can be used. So, for example, on the side of the cam disk 5 which opposes the pressure disk 6, basin like receptacles be provided and on the pressure disks 6 there can be provided spherical elevations. In the simplest case neither the cam disk 5 nor the pressure disk 6 is provided with engaging elements. However, in this case even a small torque load can cause a slipping.

For increasing the mechanical stability of the gear mechanism of the present invention as shown in FIG. 1 at least one of the drill spindles 1a, 2a of the planet gear carrier 1, 2 is provided on it's end opposite the distal end, and so on the radial carrier part of the planetary gear carrier 1, 2 with a bulge-like reinforcement 33. In FIG. 3 this further development of the invention is clearly shown.

FIG. 3 shows the planetary gear carrier 2 of the gear as shown in FIG. 1 with drill spindle 2a and planetary gear stem 2b. The drill spindles 2a are designed to be strengthened at their seat, in that the drill spindles 2a are provided with bulge like reinforcements 33. A construction of this type of the planetary gear carriers 1, 2 results in a mechanical stiffening of the planetary gear carrier 1 or 2 and thereby increases their life span. A breaking off of the drill spindles 2a can thus effectively be prevented even at higher torque loading. Preferably these bulge-like reinforcements 33 are polished on their surface, in order to remove any microscopic cracks, during the production.

The gear housing 4 of FIG. 1 preferably comprises a cylindrical inner wall. In the area of the annular gear 3 the inner wall of the gear housing 4 is constructed to be partially conical, so that starting from the motor flange 12 [sic] and progressing in the direction to the cam disk 5 an increasing cleft between the annular gear outer wall and gear housing inner wall is formed, so that thereby an optimal lubricant reservoir is formed. The gear housing 4 can, for this purpose, be formed for example of four ring-like conical wall segments associated with each other, which are interrupted by wall segments having a constant inner diameter. This partial conical construction of the inner wall of the gear housing 4 is shown with shaded lines at the lower wall.

Although in connection with the illustrative embodiment there has been discussion of a metallic cam disk, the invention is in no way limited thereto. The cam disk can also be comprised of other materials, so long as the material exhibits a sufficient mechanical hardness.

We claim:

1. A gear assembly comprising a gear housing (4), an annular gear (3) provided inside said gear housing, a planetary gearing (1, 2, 8, 9) provided internal of said annular gear (3) for reduction of rotations between a drive shaft (23) and an output shaft (24), said annular gear (3) provided with internal teeth which are in engagement with said planetary gearing, and an overload clutch provided between said annular gear and said output shaft, wherein said annular ring (3) is formed of a plastic material, and wherein said overload clutch is comprised of a guard plate (5) and a pressure ring (6), said pressure ring (6) being secured against rotation with respect to said gear housing (4), said guard plate (5) being secured against rotation with respect to the annular gear (3), said guard plate (5) and said pressure ring (6) facing each other and having engaging means provided on facing surfaces, said spring element (18) pressing against said pressure ring (6), said pressure ring (6) pressing against said guard plate (5), said guard plate (5) pressing against said annular gear (3), and said annular gear (3) pressing against a detente wall (12), such that said annular gear (3) is frictionally prevented from rotation with respect to said detente wall (12) and said pressure ring (6) until a predetermined torque loading is exceeded, and wherein upon exceeding said predetermined torque load said annular gear (3) is able to rotate with respect to said pressure ring (6) and said detente wall (12).

2. A gear assembly according to claim 1, wherein said guard plate (5) is releasably seated on said annular gear (3).

3. A gear assembly according to claim 1, wherein said annular gear (3) is provided on the face side contacting said guard plate (5) with recesses (27), said guard plate (5) is provided with projections (28), and said projections (28) of said guard plate (5) are inserted in said recesses (27) of said annular gear (3) to provide a non-slip engagement in the direction of rotation.

4. A gear assembly according to claim 1, wherein the plastic, of which the annular gear (3) is formed, is an injection moldable thermoplastic material.

5. A gear assembly as in claim 4, wherein said injection moldable plastic is polyamide 6.6 with mineral fillers.

6. A gear assembly according to claim 1, wherein said engaging means (30, 31) are projections provided in a ring pattern on the pressure ring (6) and the guard plate (5).

7. A gear assembly according to claim 1, wherein said guard plate (5) is a metal cam disk.

8. A gear assembly according to claim 7, wherein said metal cam disk (5) is formed of a very ductile and malleable metal.

9. A gear assembly according to claim 7, wherein said metal cam disk (5) is a stamped part.

10. A gear assembly according to claim 1, wherein said planetary gearing (1, 2, 8, 9) is comprised of at least a drive shaft (23) engaging an at least on one planetary gear carrier (1, 2) disposed planetary gear (8, 9), wherein the planetary gear carrier (1, 2) is provided in the area of the end of a drill spindle (1a, 2a) opposite to the distal end with a bulge-like reinforcement (33).

11. A gear assembly according to claim 10, wherein said planetary gearing (1, 2, 8, 9) is provided in two reduction steps with respectively different reductions, and that the annular gear (3) has a stepped internal gearing (26) which is adapted to mesh respectively with the two steps.

12. A gear assembly according to claim 1, wherein said gear housing (4) for receiving of the annular gear (39) is provided with an internal cylindrical wall which is conical at least in part.

13. An accumulator driven electrical power tool comprising the gear assembly according to claim 1.

14. An accumulator driven electrical power tool as in claim 13, wherein said power tool is an electric drill.

15. An accumulator driven electrical power tool as in claim 13, wherein said power tool is an electric screw driver tool.

* * * * *